May 4, 1971 K. J. M. VAN DRUNEN ET AL 3,577,308
MANUFACTURE OF A MULTICOMPONENT POLYMERIC PRODUCT
Filed Aug. 28, 1968 2 Sheets-Sheet 1
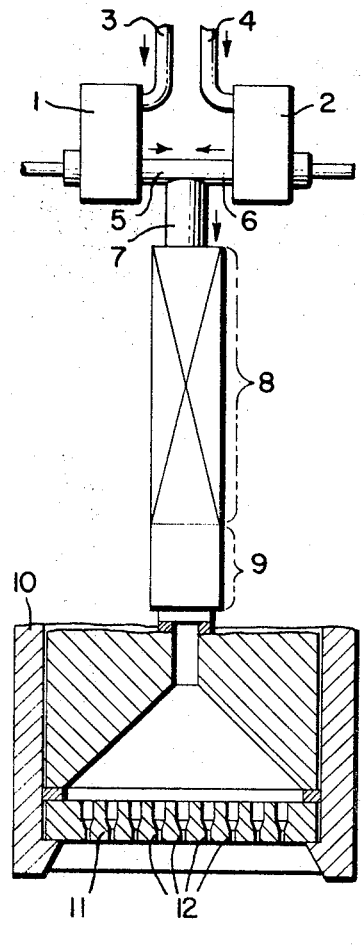
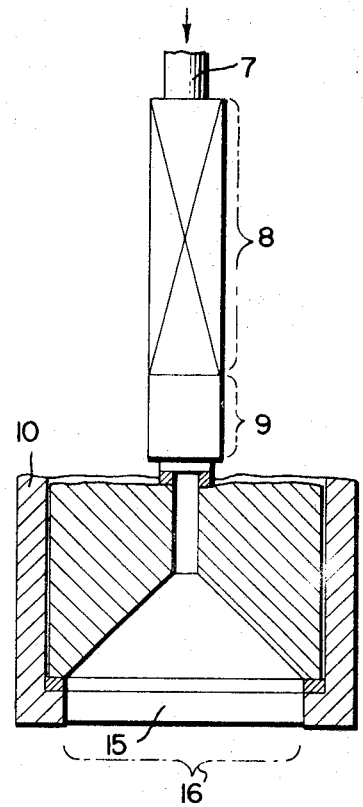
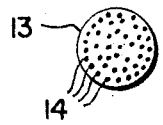
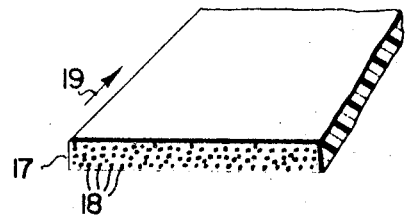
INVENTOR
KORSTIAAN JACOBUS MARINUS VAN DRUNEN &
WILHELMUS JOHANNES FONTIJN
BY Alvin F. Knight
ATTORNEY May 4, 1971  K. J. M. VAN DRUNEN ET AL  3,577,308
MANUFACTURE OF A MULTICOMPONENT POLYMERIC PRODUCT
Filed Aug. 28, 1968  2 Sheets-Sheet 2

INVENTOR
KORSTIAAN JACOBUS MARINUS
VAN DRUNEN &
WILHELMUS JOHANNES FONTIJN

BY Albin F. Knight
ATTORNEY

United States Patent Office 3,577,308
Patented May 4, 1971

---

3,577,308
MANUFACTURE OF A MULTICOMPONENT POLYMERIC PRODUCT
Korstiaan J. Marinus van Drunen and Wilhelmus J. Fontijn, Dieren, Netherlands, assignors to American Enka Corporation, Enka, N.C.
Filed Aug. 28, 1968, Ser. No. 755,903
Claims priority, application Netherlands, Sept. 27, 1967, 6712079
Int. Cl. D02g 3/00; B29f 3/10
U.S. Cl. 161—176
17 Claims

ABSTRACT OF THE DISCLOSURE

A process for the manufacture of a synthetic polymeric product consisting of a basic mass having a large number of endless threads embedded therein, which includes the steps of placing at least two polymeric components (e.g., a polyamide and a polyester), while in the liquid state, side by side to form a single main stream, repeatedly dividing and multiplying the main stream to form a stream having a first multi-layer structure, superimposing at least a second multi-layer structure onto the first, with the layers of the second being at an angle to the first multi-layer structure and thereafter extruding the resulting stream through a die.

Apparatus for effecting this process includes a feed means for supplying at least two polymeric components side by side to a main channel. A first mixer is located in the main channel and has stationary guiding means by which the main stream may be repeatedly divided and doubled into a stream having a multi-layer structure. A second mixer similar to the first is positioned downstream thereof and is turned on its longitudinal axis through an angle of at least 10° so that the resulting stream has a second layered structure that is at an angle to the first layered structure formed in the first mixer. A die means is used for extruding the resulting stream.

---

This invention relates to the manufacture of a synthetic polymeric product consisting of a basic mass having a large number of endless threads or ribbon-like layers embedded therein. More particularly, this invention relates to a process and an apparatus for producing such polymeric products in which at least two synthetic polymeric components, in the liquid state, are placed side by side to form a single main stream, the main stream is formed into a multi-layer stream, which is subsequently uniquely rearranged to form another layer-type main stream and this resulting stream is extruded through a die, and to the products produced thereby.

A similar process for the melt spinning of a multi-fibrillary yarn is known and described in applicants' copending application, Ser. No. 663,812, filed on Aug. 28, 1967. In this known process, a layered main stream is forced through a fine mesh gauze pack in such a manner that its multi-layer structure is broken up or rearranged prior to being distributed over the spinning orifices.

Although the known process gives good results, advantageously, in accordance with this invention, it has been found possible to obtain a more systematic and more regular breaking up of the initially-formed multi-layer main stream, while still using an apparatus of relatively simple construction.

Thus, this invention contemplates a process for the manufacture of a synthetic polymeric product consisting of a basic mass of at least one polymeric component having embedded therein a large number of endless threads of at least one other polymeric component, which comprises placing at least two substantially synthetic polymeric components, in the liquid state, side by side in a particular order to form a single main stream, repeatedly dividing and multiplying the main stream to form a stream having a first multi-layer structure, superimposing at least a second multi-layer structure onto the first multi-layer structure, with the layers of the second multi-layer structure being at an angle to the layers of the first multi-layer structure, and then extruding the resulting stream through a die, particularly a spinneret plate or casting slit.

In this manner, not only is the regularity of rearranging the initial multi-layer stream improved, but, advantageously, surprising effects are often produced in the resulting synthetic products.

According to this invention, the second multi-layer structure may in a simple manner be formed by passing the initially formed or first multi-layer stream through a second mixer placed at an angle to the first, in which the stream is again repeatedly divided and multiplied. In dependence on the desired product, the number of layers of the first multi-layer structure may differ from the number of layers of the second multi-layer structure.

In accordance with this invention, the angle which the layers of the first multi-layer structure make with the layers of the second multi-layer structure is at least 10°. In the preferred embodiments of the invention, the angle is in the range of from 30° to 90°.

This invention also is directed to the polymeric products made up of two or more components, more particularly, filament yarn, threads, film or sheet, that consist of a basic mass of at least one component in which at least one different component occurs finely divided in the form of endless threads or thin ribbon-like layers, and that are manufactured by the afore-described processes. In addition, this invention also concerns a process for the manufacture of yarns from a film of the above-indicated type in which the film is divided into a large number of narrow ribbons that extend in the longitudinal direction of the film.

An alternative process for the manufacture of yarns or threads from a film or sheet according to the invention is characterized in that the basic mass is entirely or partially removed from the film or the sheet or from the ribbons made therefrom. The removal of the basic mass may advantageously be effected by treating the sheet, or the film or the ribbons, with a solvent for the basic mass, or by means of a heat treatment carried out at a temperature which is above the melting point of the basic mass but below the melting point of the endless threads.

It will be appreciated that for the manufacture of a filament yarn or a spun yarn, the films or ribbons may also be processed into a fibrous material by subjecting them to various chemical, physical or mechanical treatments which are known.

Moreover, in accordance with this invention, it has been found that a very surprising effect is produced in the spinning (more particularly, melt spinning) and in the subsequent cooling in air, water, or some other indifferent or inert medium, of the yarns or threads made up of two or more synthetic polymer components which (prior to being extruded through a die) have in the above-described manner passed as a main stream through two mixers positioned at an angle to each other and each provided with stationary guiding members. The yarns, threads or filaments thus obtained are characterized in that the cross-sectional shape of each is different from that of the extrusion orifice(s) in the die. Moreover, the cross-sectional shape of the threads or filaments, according to the invention, is uniform along the length of each. Yarns, threads or filaments extruded through a die or a spinneret plate in which there are provided one or more circular spinning orifices are thus characterized in that each of the filaments or threads has a non-circular cross-sectional shape. In the last-mentioned case, the cross-section of each of the filaments may be triangular, polygonal, bean-shaped, or ribbon-shaped, or the cross-section of each of the filaments may have a tri- or multi-lobal shape.

This invention also is directed to an apparatus for carrying out the afore-described process. This apparatus is at least provided with a feed system for the side-by-side supply of two or more polymeric liquids, a main channel in which the liquids join as a main stream and, located in the main channel, a first mixer with stationary guiding members in which the main stream of liquids may be repeatedly divided and multiplied into a multi-layer structure, and a die, more particularly, a spinneret plate or casing slit, and is further characterized in that contiguous to the first mixer there is provided a second mixer of the same type, which is turned on its longitudinal axis through an angle of at least approximately 10° to the first mixer, so that the layered structure formed in the second mixer is at an angle to the layered structure formed in the first mixer. A particularly favorable embodiment of the apparatus is obtained when the above angle is in the range of from about 30° to 90°. According to the invention, the number of guiding members in the first mixer may be different from that in the second mixer.

The invention will be further described with reference to the accompanying schematic drawings in which:

FIG. 1 shows one embodiment of an apparatus of this invention for the spinning of a yarn;

FIG. 2 is an enlarged cross-sectional view of a monofilament spun on the apparatus shown in FIG. 1;

FIG. 3 shows an embodiment of an apparatus of this invention for the casting of film;

FIG. 4 is an enlarged view of a film cast on the apparatus shown in FIG. 3;

Figure 5:
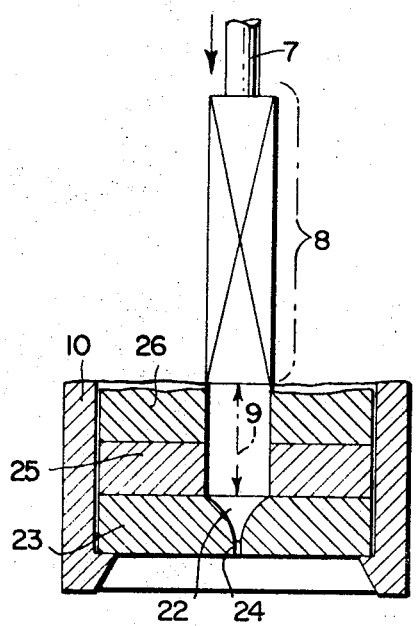
FIG. 5 shows another embodiment of the apparatus for the spinning of monofilaments.

FIG. 1 shows one embodiment of an apparatus for the melt spinning of a synthetic yarn in accordance with this invention. The reference numerals 1 and 2 designate two spinning pumps. Two different spinning liquids (i.e., polymeric components) may be sucked through the feed conduits 3 and 4 into the pumps 1 and 2 and subsequently are forced out via conduits 5 and 6. Positioned in the conduits 5 and 6 are filters (not shown). The conduits 5 and 6 symmetrically end in a conduit 7 through which the two spinning liquids flow downwards side by side in a single main stream. The conduit 7 comprises a widened section in which there is provided an initial mixer 8. In this mixer the main stream is repeatedly divided and doubled into a multi-layer stream; for instance, one containing 1,024 parallel layers in all. Immediately after leaving the mixer 8, the multi-layer stream is passed into a second mixer 9 which is of the same type as the mixer 8. The mixer 9, however, is turned on its longitudinal axis through an angle of 90° relative to the initial mixer 8, so that the layered structure formed in the second mixer 9 is oriented perpendicular to the layered structure formed in the initial mixer 8. The mixers 8 and 9 are of a type which is known, and which is described in the U.S. Pat. No. 3,051,453. These mixers contain a number of stationary guiding members. The number of guiding members in the second mixer may often be smaller than that in the initial mixer.

The effect produced by the second mixer 9 is that a second layered structure is superimposed on the layered structure formed in the initial mixer 8. In the second mixer, the layers formed in the first mixer are split perpendicular to their planes, so that individual liquid streams of one polymeric component are formed. These streams, under the influence of surface tension and viscous forces in the spinning mass, do not re-unite into contiguous parllel layers after they have passed through the second mixer, but instead remain as a plurality of sub-streams within the resulting multi-component stream.

After the second mixer 9 the conduit widens in downward direction to end in a spinning assembly 10. The assembly has at its bottom end a spinneret plate 11 in which there are provided a large number of circular spinning orifices 12. Through each of the spinning orifices 12 there is extruded a filament which, after solidification, approximately has the cross-section shown in FIG. 2, namely, a basic mass 13 of the one polymer and finely distributed therein a very large number of endless threads 14 of the other polymer.

In producing the monofilament products of this invention, there may be fed to the spinning pumps 1 and 2, respectively, a nylon-6 polyamide of a relative viscosity of 2.9 and a polyethylene terephthalate having a relative viscosity of 1.6. The polymers, i.e., polyamide and polyethylene terephthalate, are supplied in a weight ratio of 70/30.

FIG. 3 shows a different embodiment of the apparatus in which the spinneret plate in the assembly 10 is replaced by a casting slit 15, the length of which is designated by reference numeral 16; with like parts being indicated by like numerals. In practice, the length 16 of the casting slit may be of from 50 to 100 cm., and the width of the slit perpendicular to the plane of the drawing (as shown in FIG. 3) may be about 0.3 mm.

FIG. 4 is an enlarged view of a film cast on the apparatus shown in FIG. 3. The film thickness may be in the range of from 10 to 100μ (1μ=0.001 mm.). In the film shown in FIG. 4, the one polymer forms the basic mass 17 in which a large number of endless threads 18 of the other polymer extend in the longitudinal direction 19 of the film. The films may (in one of several known ways) be processed into yarns or fibers.

Alternatively, the two mixers with stationary guiding means may be used for processing, in a similar manner, sheets having a thickness in the range of from about 0.75 mm. to a few millimeters. In these sheets there extend endless threads having a thickness in the range of from 0.200 to 0.500 mm.

Although in the aforementioned embodiments the two mixers 8 and 9 are positioned at an angle of 90° to each other, it will be appreciated that the invention is not limited to this angle, and that other angular positions will also produce the desired results.

FIG. 5 is a schematic representation of an apparatus for the spinning of a monofilament, with like parts being referred to by like reference numerals. In the spinning apparatus shown in FIG. 5, two spinning liquids also flow side by side through the conduit 7 in a single main stream. The main stream is first fed into the initial mixer 8 in which there are positioned six stationary guiding members (not shown) for repeatedly dividing and doubling the main stream into a multi-layer stream. Owing to the presence of six guiding members, the main stream, immediately after it has left the mixer 8, is made up of a number of layers which is equal to $2 \times 2^6 = 128$.

Figure 6:
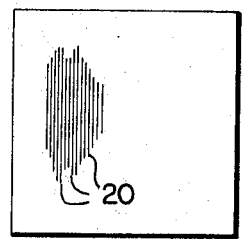
FIG. 6 is a schematic cross-sectional view of the main stream of polymer immediately after it has left the first mixer of the apparatus shown in FIG. 5.
Figure 7:
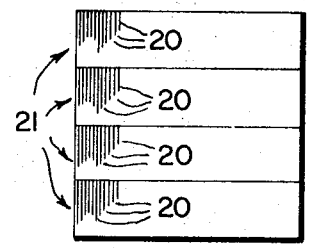
FIG. 7 is a schematic cross-sectional view of the main stream immediately after it has left the second mixer of the apparatus shown in FIG. 5.

FIG. 6 schematically shows the first layered structure of the main stream, the individual layers of one component being referred to by numeral 20. The multi-layer stream then flows into the second mixer 9, which is of the same type as the initial mixer 8, except that it contains only two stationary guiding members (not shown); also, the second mixer is again positioned at an angle of 90° to the initial mixer. This arrangement leads to the formation of the second layered structure or stream which, when leaving the second mixer, is made up of $2^2=4$ layers, which are designated by reference numeral 21 in FIG. 7. The cross-sectional structure which the main stream has (as it leaves the second mixer 9) is schematically shown in FIG. 7. It can be seen from this figure that the second layered structure is superposed on the first layered structure. As a result, each of the four layers 21 of the second layered structure is made up of approximately $$\frac{128}{4}=32$$

layers 20 of the first layered structure. Immediately thereupon the main stream thus formed by passing through the mixers 8 and 9 flows into the converging conduit 22 in the spinneret plate 23. The conduit 22 ends in a single circular spinning orifice 24 provided in the spinneret plate 23. Resting on the spinneret plate 23, which may have a thickness of, for example, approximately 10 mm., are plates 25 and 26. The main stream is extruded through the spinning orifice 24 in the form of a thread (not shown), which is in a conventional manner cooled with an indifferent or inert medium and then, after it has been stretched, if required, wound into a package.

Figure 8:
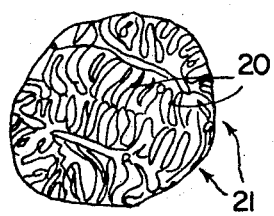
FIG. 8 is an enlarged view of the non-round cross-section of a filament spun on the apparatus shown in FIG. 5.

FIG. 8 is an illustration (magnification of 300) of the non-round cross-section of one filament or thread spun on the apparatus shown in FIG. 5. Upstream of the mixers 8 and 9, the main stream in the conduit 7 consisted of the two polymeric components polyamide and polyester supplied in a weight ratio of 70/30. The two mixers were at an angle of 90° to each other, the first and the second mixer being provided with 6 and 2 guiding members, respectively. In FIG. 8, the layers 20 and 21 are clearly visible, and the way in which they are arranged is similar to that schematically shown in FIG. 7. The layers 20 shown in FIG. 8 form the endless threads or ribbon-like layers of the one component, i.e., the polyester, which extend in the longitudinal direction of the spun thread and which are embedded in a basic mass of the other component, i.e., the polyamide.

Figure 9:
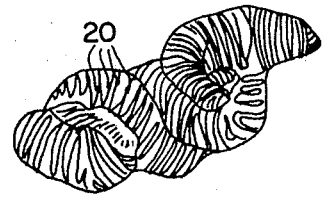
FIGS. 9, 10, 11 and 12 are enlarged views of different non-round cross-sections of filaments spun on the apparatus shown in FIG. 5.

FIG. 9 is a representation (magnification of 300) of the substantially ribbon-shaped cross-section of another embodiment of a thread spun on an apparatus of the type shown in FIG. 5. In producing this thread, the main stream was initially made up of the polymeric components polyamide and polyester. However, the components were present in a weight ratio of 50/50; and the second mixer was turned on its longitudinal axis through an angle of 60° to the initial mixer. Also in this embodiment, the first and second mixer were provided with 6 and 2 stationary guiding members, respectively. Despite the fact that in this embodiment the spinning orifice also had a circular cross-section, the spun thread was surprisingly found to have the ribbon-shaped cross-section shown in FIG. 9, which cross-section was uniform along the thread.

Figure 10:
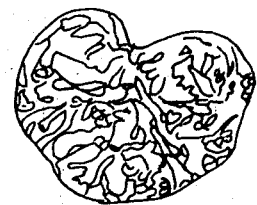

FIG. 10 is a representation (magnification of 300) of the substantially bean-shaped cross-section of another embodiment of a thread spun on an apparatus of the type shown in FIG. 5. The main stream in this case was initially made up of two layers of the polymeric components polyamide and polyester in a weight ratio of 70/30, and the second mixer was turned on its longitudinal axis through an angle of 90° to the first mixer. The first and the second mixer were however provided with 4 and 8 stationary guiding members, respectively. Despite the fact that in this embodiment the spinning orifice also had a circular cross-section, the spun thread was found to have the substantially bean-shaped cross-section shown in FIG. 10. This cross-section also was uniform along the length of the thread.

Figure 11:
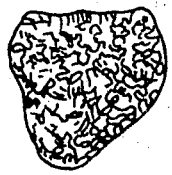

FIG. 11 is a representation (magnification of 300) of the substantially triangular cross-section of still another embodiment of a thread spun on an apparatus of the type shown in FIG. 5. Here the main stream was initially made up of two layers of the components polyamide and polyester in a weight ratio of 30/70, and the second mixer was turned on its longitudinal axis through an angle of 90° to the first mixer. The first and the second mixer were provided with 8 and 4 stationary guiding members, respectively. Although in this embodiment the spinning orifice again had a circular cross-section, the spun thread was found to have the substantially triangular cross-section shown in FIG. 11, and advantageously this cross-section was also uniform along the thread.

Figure 12:

FIG. 12 is a representation (magnification of 300) of the substantially "potato"-shaped cross-section of yet another embodiment of a thread spun on an apparatus of the type shown in FIG. 5. In producing this embodiment, the main stream was initially made up of two layers of the components polyamide and polyester in a weight ratio of 67/33, and the second mixer was turned on its longitudinal axis through an angle of 90° to the first mixer. The first and the second mixer were provided with 8 and 4 stationary guiding members, respectively. Again, although the spinning orifice used had a circular cross-section, the spun thread was found to have the substantially "potato"-shaped cross-section shown in FIG. 12, which cross-section was uniform along the thread.

Although the non-round threads shown in FIGS. 9 to 12 were spun on an apparatus (FIG. 5) provided with a spinneret plate 23 with only one orifice 24, it is also quite possible to spin multifilament yarns with the aid of a spinneret plate in which there are provided a large number of orifices. However, if in such cases it is desirable that the filaments obtained should have a non-round cross-section (such as in FIGS. 9 to 12), then the distance between the second mixer 9 and the spinneret plate must be chosen to be relatively small.

It will be appreciated that within the scope of the invention several modifications may be made. For instance, the main stream may initially be made up of three, four, five or more components, and each component may consist of a mixture of polymers. Although, in the embodiments shown in the drawings, the two mixers are positioned contiguous to each other, it is also possible to place them at a considerable distance from each other.

It will also be understood that by the term "endless threads" if is meant that for all practical purposes the threads may be considered endless or continuous.

It will be appreciated that many combinations of nonmiscible polymeric spinning components may be used to prepare the film and fibrillary products (i.e., yarn, threads or filaments) of this invention. The most appropriate combination will depend on the intended application. Exemplary of some possible combinations of the components are nylon and polypropylene; nylon and polyethylene; nylon and polyester; nylon and polystyrene; polyacrylonitrile and polyvinyl alcohol; nylon, polyester and copolyester amides; nylon, a copolyamide, e.g., one prepared from nylon 6 and nylon 11, and polystyrene; and the like.

Also, the yarns produced by this invention may be made into yarn beds or webs which can be further treated to reduce the coherence of the yarns, e.g., by blowing with air, and/or to form bonded non-woven layered materials by the addition of a binder such as rubber latex.

Also, a number of solvents have been found suitable for selectively removing the basic mass from the films in accordance with the invention. These solvents include various organic compounds. For example, aromatic hydrocarbons such as benzene, toluene, or xylene are particularly effective for removing components such as polyethylene or polystyrene from a bicomponent film in which the other component is nylon-6.

What is claimed is:

1. A process for the manufacture of a synthetic polymeric elongated product consisting of a basic mass of at least one polymeric component having a large number of endless layers of at least one other polymeric component embedded longitudinally therein, which comprises placing at least two non-miscible polymeric components, in the liquid state, side-by-side in a particular order to form a single main stream, said synthetic non-miscible polymeric components being used in combinations selected from the group consisting of nylon and polypropylene; nylon and polyethylene; nylon and polyester; nylon and polystyrene; polyacrylonitrile and polyvinylalcohols; nylon, polyester, and copolyester amides; and nylon, copolyamide, and polystyrene; repeatedly dividing and multiplying this main stream in a first mixer to form a single first stream having a first multi-layered structure containing more layers than in said single main stream; repeatedly dividing and multiplying the first stream to form a single second stream having at least a second multi-layered structure superimposed on to the first multi-layered structure in a second mixer, the layers of the second multi-layered structure being positioned at an angle of from approximately 10° to 90° to the layers of the first multi-layered structure in said single second stream and said second mixer being similar to the first mixer and being rotated on its longitudinal axis through said angle; and thereafter extruding the second stream through at least one extrusion orifice in a die to form said elongated product.

2. The process of claim 1, in which the number of layers of the first multi-layer structure is different from that of the second multi-layer structure.

3. The process of claim 1 in which the angle at which the layers of the first multi-layer structure are positioned to the layers of the second multi-layer structure is in the range of from about 30° to 90°.

4. A process for the manufacture of a yarn from a film product of the process of claim 1 which comprises dividing the film into a large number of ribbons that extend in the longitudinal direction of the film.

5. A process for the manufacture of fibrillary products from a film product of the process of claim 1, which comprises removing at least part of the basic mass from the film.

6. The process of claim 5 in which the basic mass is removed by treating the film with a solvent for the basic mass.

7. The process of claim 5 in which the basic mass is removed from the film by a heat treatment carried out at a temperature which is above the melting point of the basic mass, but considerably below the melting point of the endless threads.

8. The process of claim 5 in which the film is processed into a fibrillary product by subjecting the film to a chemical, physical or mechanical treatment.

9. The process of claim 5 in which fibrillary product is a yarn and further comprising forming the yarn into a yarn web and thereafter reducing the coherence of the yarns by blowing air under pressure onto the yarns.

10. The process of claim 9 in which at least two yarn webs are laid on each other.

11. The process of claim 10 in which the yarn webs are united by a rubber latex binder.

12. The process of claim 1 in which the layers of polymeric components in each multi-layered structure are parallel and the number of layers of polymeric components formed in the first multi-layered structure is different from the number of layers of polymeric components formed in the second multi-layered structure.

13. An elongated product manufactured by extrusion through an extrusion orifice in a die according to the process of claim 1, said product being in the form of a filament, film or sheet, having a cross-sectional shape similar to that of said extrusion orifice, and comprising a basic mass of at least one polymeric component in which the layers of at least one different polymeric component occur in the form of a plurality of endless threads extending longitudinally thereof.

14. A filamentary product manufactured by extrusion of the second stream through a single extrusion orifice in a die according to the process of claim 1, said product being in the form of a continuous monofilament having a cross-sectional shape different from that of said extrusion orifice and comprising a basic mass of at least one polymeric component in which the layers of at least one different polymeric component occur in the form of endless ribbon-like layers extending longitudinally thereof, the arrangement of said ribbon-like layers being similar to the arrangement of the layers in the second stream.

15. An apparatus for extruding polymeric multicomponent elongated products which comprises a feed means for supplying at least two non-miscible polymeric components side-by-side, in a liquid state, to a main channel in which the polymers join as a single main stream, a first mixer located in the main channel, said mixer having a stationary guide means by which the main stream may be repeatedly divided and doubled into a first stream having a first multi-layered structure, a second mixer similar to the first mixer placed downstream of and directly in communication with said first mixer, said second mixer being rotated on its longitudinal axis to an angle of from approximately 10° to 90° to the first mixer to form a single second stream having a second layered structure that is at said angle to the first layered structure formed in the first mixer and die means directly downstream of said second mixer for extruding the second stream to form said elongated products.

16. The apparatus of claim 1 in which said angle is in the range of from 30° to 90°.

17. The apparatus of claim 1 in which the number of guiding means in the first mixer differs from that in the second mixer.

References Cited

UNITED STATES PATENTS

| | | | |
|---|---|---|---|
| 2,815,532 | 12/1957 | Braunlich | 264—171UX |
| 3,051,452 | 8/1962 | Nobel | 259—4 |
| 3,051,453 | 8/1962 | Sluijfers | 259—4 |
| 3,099,067 | 7/1963 | Merriam et al. | 28—82 |
| 3,369,057 | 2/1968 | Twilley | 260—857 |
| 3,382,305 | 5/1968 | Breen | 264—171 |
| 3,422,175 | 1/1969 | Rowland | 264—171X |
| 3,443,277 | 5/1969 | Frielingsdorf | 264—171X |
| 3,444,031 | 5/1969 | Schrenk | 264—171X |
| 3,447,308 | 6/1969 | Fonjijin et al. | 57—153X |

FOREIGN PATENTS

| | | | |
|---|---|---|---|
| 1,043,762 | 9/1966 | Great Britain | 264—171 |
| 447,468 | 11/1967 | Switzerland | 264—171 |
| 275,670 | 10/1964 | Netherlands | 264—171 |
| 6601116 | 7/1967 | Netherlands | 264—171 |

JAY H. WOO, Primary Examiner

U.S. Cl. X.R.

18—8, 12; 28—1, 72; 161—173, 177; 259—4; 264— Dig. 47, 147, 171, 344